(12) United States Patent
Obiya et al.

(10) Patent No.: US 11,265,037 B2
(45) Date of Patent: Mar. 1, 2022

(54) RADIO FREQUENCY CIRCUIT AND COMMUNICATION DEVICE

(71) Applicant: Murata Manufacturing Co., Ltd., Kyoto (JP)

(72) Inventors: Hidenori Obiya, Nagaokakyo (JP); Hirotsugu Mori, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 76 days.

(21) Appl. No.: 16/903,655

(22) Filed: Jun. 17, 2020

(65) Prior Publication Data

US 2020/0403651 A1    Dec. 24, 2020

(30) Foreign Application Priority Data

Jun. 21, 2019  (JP) .............................. JP2019-115463

(51) Int. Cl.
   *H04B 1/04*   (2006.01)
   *H04B 1/44*   (2006.01)
   *H04W 84/12*  (2009.01)

(52) U.S. Cl.
   CPC ................. *H04B 1/44* (2013.01); *H04B 1/04* (2013.01); *H04B 2001/0408* (2013.01); *H04W 84/12* (2013.01)

(58) Field of Classification Search
   CPC .... H04B 1/04; H04B 1/44; H04B 2001/0408; H04W 84/02; H04W 84/06; H04W 88/12; H04W 84/08
   See application file for complete search history.

(56) References Cited

U.S. PATENT DOCUMENTS

| | | | |
|---|---|---|---|
| 2015/0094008 A1* | 4/2015 | Maxim | H03F 1/56 455/245.1 |
| 2016/0127015 A1 | 5/2016 | Wloczysiak et al. | |
| 2016/0323080 A1 | 11/2016 | Khlat | |
| 2017/0134058 A1* | 5/2017 | Leipold | H04W 4/70 |
| 2018/0034152 A1 | 2/2018 | Mura et al. | |
| 2020/0395960 A1* | 12/2020 | Mori | H04B 1/18 |

OTHER PUBLICATIONS

Skyworks Solutions, Inc., MSD for DC_3_n3 One and Two UL Antenna Architectures, 3GPP TSG-RAN WG4 Meeting 90, Feb. 25-Mar. 1, 2019, pp. 1-5, R4-1901356, Skyworks Solutions, Inc., Athens, Greece.

* cited by examiner

*Primary Examiner* — Thanh C Le
(74) *Attorney, Agent, or Firm* — Pearne & Gordon LLP

(57) ABSTRACT

A radio frequency circuit includes a first transfer circuit including a first filter and a second filter, and a second transfer circuit including a third filter and a fourth filter. Passbands of the first filter and the third filter at least partially overlap each other. Passbands of the second filter and the fourth filter at least partially overlap each other. The first filter transfers a radio frequency signal of a first communication system. The third filter transfers a radio frequency signal of a second communication system. The second filter transfers one of a radio frequency signal of the first communication system or a radio frequency signal of the second communication system. The fourth filter transfers the other of a radio frequency signal of the first communication system or a radio frequency signal of the second communication system.

19 Claims, 5 Drawing Sheets

RADIO FREQUENCY CIRCUIT AND COMMUNICATION DEVICE

CROSS REFERENCE TO RELATED APPLICATION

The present application is based on and claims priority of Japanese Patent Application No. 2019-115463 filed on Jun. 21, 2019. The entire disclosure of the above-identified application, including the specification, drawings and claims, is incorporated herein by reference in its entirety.

TECHNICAL FIELD

The present disclosure relates to a radio frequency circuit and a communication device that includes the radio frequency circuit.

BACKGROUND

Radio frequency front-end circuits that support multiband and multimode communication are required to simultaneously transfer a plurality of radio frequency signals with low loss.

Patent Literature (PTL) 1 discloses a receiving module (transfer circuit) having a configuration in which a plurality of filters with different passbands are connected to an antenna via a multiplexer.

PTL 1: U.S. Unexamined Patent Application Publication No. 2016/0127015

BRIEF SUMMARY

With the receiving module (a transfer circuit) described in PTL 1, it is possible to simultaneously transfer radio frequency signals of a plurality of communication bands in a single communication system. In recent years, however, there is a demand that radio frequency signals be simultaneously transferred in a plurality of different communication systems (e.g., the fourth generation mobile communication system and the fifth generation communication system).

However, when radio frequency signals of a plurality of communication bands having overlapping frequency bands are simultaneously transferred via the same transfer circuit, there is a problem that the isolation between the signals is deteriorated.

In view of the above-described circumstances, the present disclosure is to provide radio frequency circuits and communication devices which, when radio frequency signals of a plurality of communication systems are simultaneously transferred, suppress deterioration in the isolation between the signals.

In order to achieve the above-described object, a radio frequency circuit according to one aspect of the present disclosure is a radio frequency circuit configured to transfer a radio frequency signal of a first communication system and a radio frequency signal of a second communication system. The second communication system is different than the first communication system. The radio frequency circuit includes: a first transfer circuit including a first filter and a second filter; and a second transfer circuit including a third filter and a fourth filter. In the radio frequency circuit, a passband of the first filter and a passband of the third filter at least partially overlap each other, a passband of the second filter and a passband of the fourth filter at least partially overlap each other, the first filter is configured to transfer a radio frequency signal of the first communication system, the third filter is configured to transfer a radio frequency signal of the second communication system, the second filter is configured to transfer one of a radio frequency signal of the first communication system or a radio frequency signal of the second communication system, and the fourth filter is configured to transfer the other of a radio frequency signal of the first communication system or a radio frequency signal of the second communication system.

According to the present disclosure, it is possible to provide radio frequency circuits and communication devices which suppress deterioration in the isolation between signals when radio frequency signals of a plurality of communication systems are simultaneously transferred.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION

Figure 1:
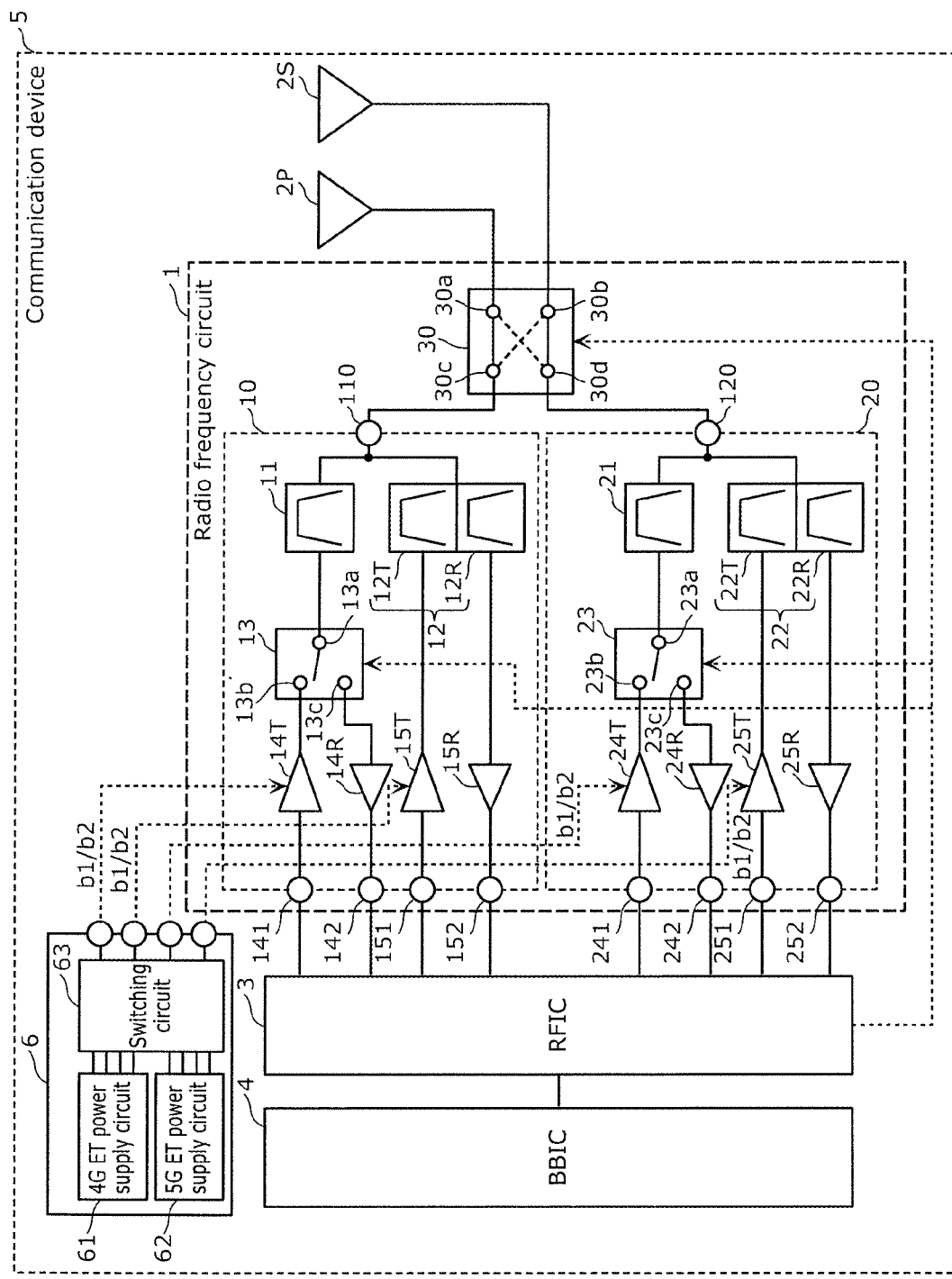
FIG. 1 is a diagram illustrating a circuit configuration of a radio frequency circuit and a communication device according to an embodiment.

The following describes in detail an embodiment of the present disclosure with reference to implemental examples and drawings. It is to be noted that the exemplary embodiment described below shows a general or specific example. The numerical values, shapes, materials, structural components, the arrangement and connection of the structural components, and so on, shown in the following embodiment are mere examples, and therefore do not limit the present disclosure.

Among the structural components in the following embodiment, structural components not recited in the independent claims are described as arbitrary structural components. In addition, the sizes of structural components and the ratios of the sizes in the drawings are not necessarily strictly illustrated.

Embodiments

1. Configurations of Radio Frequency Circuit 1 and Communication Device 5

FIG. 1 is a diagram illustrating an example of a circuit configuration of radio frequency circuit 1 and communication device 5 according to an embodiment. As illustrated in the diagram, communication device 5 includes radio frequency circuit 1, antennas 2P and 2S, RF signal processing circuit (RFIC) 3, baseband signal processing circuit (BBIC) 4, and ET power supply circuit 6.

Radio frequency circuit 1 includes transfer circuits 10 and 20, and switch 30.

Transfer circuit 10 is one example of a first transfer circuit, and transfers a radio frequency signal of at least one communication system out of the first communication system and a second communication system. Transfer circuit 10 includes: transmission and reception terminal 110; transmission input terminals 141 and 151; reception output terminals 142 and 152; filter 11; duplexer 12; switch 13; power amplifiers 14T and 15T, and low noise amplifiers 14R and 15R.

It should be noted that the first communication system and the second communication system are systems of different communication standards. The first communication system is, for example, the fourth generation mobile communication system (4G). The second communication system is, for example, the fifth generation mobile communication system (5G).

Filter 11 is one example of a first filter. Filter 11 has, as a passband, a first communication band stipulated at least in the first communication system, and is connected between transmission and reception terminal 110 and common terminal 13a.

Switch 13 is a switch for switching between transmission and reception, and includes common terminal 13a and selection terminals 13b and 13c. Switch 13 exclusively switches between connecting common terminal 13a to selection terminal 13b and connecting common terminal 13a to selection terminal 13c.

Power amplifier 14T is one example of a first power amplifier, and amplifies a radio frequency signal that has been input from transmission input terminal 141. Power amplifier 14T is connected between transmission input terminal 141 and selection terminal 13b.

Low noise amplifier 14R amplifies a radio frequency signal that has been input from transmission and reception terminal 110. Low noise amplifier 14R is connected between selection terminal 13c and reception output terminal 142.

With the above-described configuration of transfer circuit 10, when common terminal 13a and selection terminal 13b are connected to each other, a radio frequency signal that has been amplified by power amplifier 14T passes through switch 13 and filter 11 and is output from transmission and reception terminal 110. In addition, when common terminal 13a and selection terminal 13c are connected to each other, a radio frequency signal that has been input from transmission and reception terminal 110 and has passed through filter 11 and switch 13 is amplified by low noise amplifier 14R and output from reception output terminal 142. More specifically, transfer circuit 10 executes transmission and reception of the radio frequency signals of the first communication band in a time division duplex (TDD) system, through the switching operation performed by switch 13. Filter 11 is, for example, a TDD filter having, as a passband, the first communication band that corresponds to the TDD system.

Duplexer 12 is one example of a second filter, and causes a radio frequency signal of at least one of the first communication system or the second communication system to pass through. Duplexer 12 includes transmission filter 12T and reception filter 12R. The output terminal of transmission filter 12T and the input terminal of reception filter 12R are connected to transmission and reception terminal 110. The input terminal of transmission filter 12T is connected to the output terminal of power amplifier 151, and the output terminal of reception filter 12R is connected to the input terminal of low noise amplifier 15R. Transmission filter 12T has, as a passband, a transmission band of the second communication band stipulated in the first communication system, for example. Reception filter 12R has, as a passband, a reception band of the second communication band stipulated in the first communication system, for example.

Power amplifier 15T is one example of a second power amplifier, and amplifies a radio frequency signal that has been input from transmission input terminal 151. Power amplifier 15T is connected between transmission input terminal 151 and the input terminal of transmission filter 12T.

Low noise amplifier 15R amplifies a radio frequency signal that has been input from transmission and reception terminal 110. Low noise amplifier 15R is connected between the output terminal of reception filter 12R and reception output terminal 152.

According to the above-described configuration of transfer circuit 10, a radio frequency signal that has been amplified by power amplifier 15T passes through transmission filter 12T and is output from transmission and reception terminal 110. In addition, a radio frequency signal that has been input from transmission and reception terminal 110 and has passed through reception filter 12R is amplified by low noise amplifier 15R and output from reception output terminal 152. Accordingly, transfer circuit 10 executes transmission and reception of the radio frequency signal of the second communication band in a frequency division duplex (FDD) system. Transmission filter 12T and reception filter 12R are each, for example, an FDD filter having, as a passband, the second communication band that corresponds to the FDD system.

Power amplifiers 14T and 15T, and low noise amplifiers 14R and 15R include, for example, a Si complementary metal oxide semiconductor (CMOS) or a field-effect transistor (FET), a hetero bipolar transistor (HBT), etc., which include GaAs as a material.

In transfer circuit 10, low noise amplifiers 14R and 15R and switch 13 may be disposed on a semiconductor integrated circuit (IC). In other words, low noise amplifiers 14R, 15R, and switch 13 may be disposed on the same IC substrate as a single chip. The semiconductor IC includes a CMOS, for example. More specifically, the semiconductor IC is fabricated by SOI processing. This allows manufacturing semiconductor ICs at low cost. It should be noted that the semiconductor IC may include at least one of GaAs, SiGe, or GaN. With this, it is possible to output a radio frequency signal having a high-quality amplification performance and noise performance. Furthermore, the above-described semiconductor IC may further include power amplifiers 14T and 15T.

In addition, low noise amplifiers 14R and 15R, power amplifiers 14T and 15T, switch 13, filter 11, and duplexer 12 included in transfer circuit 10 may be disposed on a single mounting board.

It should be noted that transfer circuit 10 may execute transmission and reception of the radio frequency signals of the first communication band in the FDD system. in this case, a duplexer that includes a transmission filter and a reception filter is disposed instead of filter 11 and switch 13. In addition, transfer circuit 10 may execute transmission and reception of the radio frequency signals of the second communication band in the TDD system. in this case, a TDD filter and a switch are disposed instead of duplexer 12.

Transfer circuit 20 is one example of a second transfer circuit, and transfers a radio frequency signal of at least the second communication system out of the first communication system and the second communication system. Transfer circuit 20 includes: transmission and reception terminal 120; transmission input terminals 241 and 251; reception output terminals 242 and 252; filter 21; duplexer 22; switch 23; power amplifiers 24T and 25T, and low noise amplifier 24R and 25R.

Filter 21 is one example of a third filter. Filter 21 has, as a passband, a third communication band stipulated at least in the second communication system, and is connected between transmission and reception terminal 120 and common terminal 23a.

Switch 23 is a switch for switching between transmission and reception, and includes common terminal 23a and selection terminals 23b and 23c. Switch 23 exclusively switches between connecting common terminal 23a to selection terminal 23b and connecting common terminal 23a to selection terminal 23c.

Power amplifier 24T is one example of a third power amplifier, and amplifies a radio frequency signal that has been input from transmission input terminal 241. Power amplifier 24T is connected between transmission input terminal 241 and selection terminal 23b.

Low noise amplifier 24R amplifies a radio frequency signal that has been input from transmission and reception terminal 120. Low noise amplifier 24R is connected between selection terminal 23c and reception output terminal 242.

With the above-described configuration of transfer circuit 20, when common terminal 23a and selection terminal 23b are connected to each other, a radio frequency signal that has been amplified by power amplifier 24T passes through switch 23 and filter 21 and is output from transmission and reception terminal 120. In addition, when common terminal 23a and selection terminal 23c are connected to each other, a radio frequency signal that has been input from transmission and reception terminal 120 and has passed through filter 21 and switch 23 is amplified by low noise amplifier 24R and output from reception output terminal 242. More specifically, transfer circuit 20 executes transmission and reception of the radio frequency signals of the third communication band in the TDD system, through the switching operation performed by switch 23. Filter 21 is, for example, a TDD filter having, as a passband, the third communication band that corresponds to the TDD system.

Duplexer 22 is one example of a fourth filter, and causes a radio frequency signal of at least the other of the first communication system or the second communication system to pass through. Duplexer 22 includes transmission filter 22T and reception filter 22R. The output terminal of transmission filter 22T and the input terminal of reception filter 22R are connected to transmission and reception terminal 120. The input terminal of transmission filter 22T is connected to the output terminal of power amplifier 25T, and the output terminal of reception filter 22R is connected to the input terminal of low noise amplifier 25R. Transmission filter 22T has, as a passband, a transmission band of the fourth communication band stipulated in the second communication system, for example. Reception filter 22R has, as a passband, a reception band of the fourth communication band stipulated in the second communication system, for example.

Power amplifier 25T is one example of a fourth power amplifier, and amplifies a radio frequency signal that has been input from transmission input terminal 251. Power amplifier 25T is connected between transmission input terminal 251 and the input terminal of transmission filter 22T.

Low noise amplifier 25R amplifies a radio frequency signal that has been input from transmission and reception terminal 120. Low noise amplifier 25R is connected between the output terminal of reception filter 22R and reception output terminal 252.

According to the above-described configuration of transfer circuit 20, a radio frequency signal that has been amplified by power amplifier 25T passes through transmission filter 22T and is output from transmission and reception terminal 120. In addition, a radio frequency signal that has been input from transmission and reception terminal 120 and has passed through reception filter 22R is amplified by low noise amplifier 25R and output from reception output terminal 252. In other words, transfer circuit 20 executes transmission and reception of the radio frequency signal of the fourth communication band in the FDD system. Transmission filter 22T and reception filter 22R are each, for example, an FDD filter having, as a passband, the fourth communication band that corresponds to the FDD system.

Power amplifiers 24T and 25T, and low noise amplifiers 24R and 25R include, for example, a Si CMOS, or a field-effect transistor (FET), a hetero bipolar transistor (HBT), etc., which include GaAs as a material.

In transfer circuit 20, low noise amplifiers 24R and 25R and switch 23 may be disposed on a semiconductor IC. In other words, low noise amplifiers 24R, 25R, and switch 23 may be disposed on the same IC substrate as a single chip. The semiconductor IC includes a CMOS, for example. More specifically, the semiconductor IC is fabricated by silicon on insulator (SOI) processing. This allows manufacturing semiconductor ICs at low cost. It should be noted that the semiconductor IC may include at least one of GaAs, SiGe, or GaN. With this, it is possible to output a radio frequency signal having a high-quality amplification performance and noise performance.

Furthermore, the above-described semiconductor IC may further include power amplifiers 24T and 25T.

In addition, low noise amplifiers 24R and 25R, power amplifiers 24T and 25T, switch 23, filter 21, and duplexer 22 included in transfer circuit 20 may be disposed on a single mounting board.

It should be noted that transfer circuit 20 may execute transmission and reception of the radio frequency signals of the third communication band in the FDD system. In this case, a duplexer that includes a transmission filter and a reception filter is disposed instead of filter 21 and switch 23. In addition, transfer circuit 20 may execute transmission and reception of the radio frequency signals of the fourth communication band in the TDD system. In this case, a TDD filter and a switch are disposed instead of duplexer 22.

According to the above-described configuration, radio frequency circuit 1 is capable of (1) transferring a radio frequency signal of the first communication system, (2) transferring a radio frequency signal of the second communication system, and (3) simultaneously transferring a radio frequency signal of the first communication system and a radio frequency signal of the second communication system. Furthermore, radio frequency circuit 1 is also capable of (4) simultaneously transferring two radio frequency signals of the same communication system.

Figure 2:
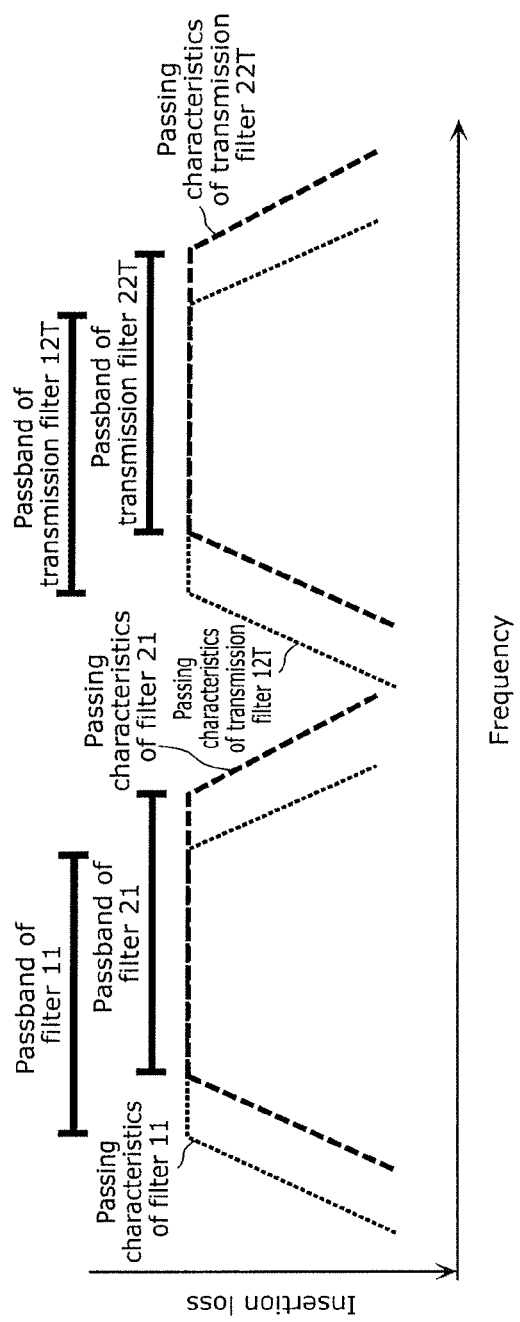
FIG. 2 is a diagram illustrating frequency relationships of passbands of each filter according to the embodiment.

FIG. 2 is a diagram illustrating frequency relationships of passbands of each filter according to the embodiment in FIG. 1. In the diagram, an outline of passing characteristics of filters 11 and 21, and transmission filters 12T and 22T included in radio frequency circuit 1 is illustrated.

As illustrated in FIG. 2, in radio frequency circuit 1 according to the present embodiment in FIG. 1, the passband of filter 11 (the first communication band) and the passband of filter 21 (the third communication band) at least partially overlap each other. In addition, the passband of transmission filter 12T (the transmission band of the second communication band) and the passband of transmission filter 22T (the transmission band of the fourth communication band) at least partially overlap each other. In other words, the passband of duplexer 12 and the passband of duplexer 22 at least partially overlap each other.

It should be noted that, although FIG. 2 shows the case where the passband of transmission filter 12T included in duplexer 12 and the passband of transmission filter 22T included in duplexer 22 partially overlap each other, the passband of reception filter 12R included in duplexer 12 and the passband of reception filter 22R included in duplexer 22 may partially overlap each other, instead of the case shown in FIG. 2. Alternatively, the passband of transmission filter 12T and the passband of transmission filter 22T may partially overlap, and the passband of reception filter 12R and the passband of reception filter 22R may partially overlap each other.

According to the above-described configuration of radio frequency circuit 1, it is possible to simultaneously transfer a radio frequency signal of the first communication system and a radio frequency signal of the second communication system. In this case, even when the frequency band of the radio frequency signal of the first communication system and the frequency band of the radio frequency signal of the second communication system partially overlap each other, it is possible to distribute the radio frequency signal of the first communication system and the radio frequency signal of the second communication system into different transfer circuits, namely, transfer circuit 10 and transfer circuit 20, and transfer the two radio frequency signals, and thus the isolation between the two radio frequency signals simultaneously transferred is improved. In addition, radio frequency circuit 1 includes two sets of a combination of two filters which correspond to two different communication systems and are disposed in two different transfer circuits 10 and 20, and have passbands that partially overlap each other. Accordingly, it is possible to select communication bands for the radio frequency signals to be simultaneously transferred. In addition, it is possible to simultaneously transfer three or more radio frequency signals.

For example, as the combinations of bands for the simultaneous transferring of two radio frequency signals, it is possible to perform (1) simultaneous transferring using the first communication band and the third communication band, (2) simultaneous transferring using the second communication band and the fourth communication band, (3) simultaneous transferring using the second communication band and the third communication band, and (4) simultaneous transferring using the first communication band and the fourth communication band. In addition, as the combinations of bands for the simultaneous transferring of three radio frequency signals, it is possible to perform, for example, (5) simultaneous transferring using the first communication band, the second communication band, and the third communication band, (6) simultaneous transferring using the first communication band, the second communication band, and the fourth communication band, (7) simultaneous transferring using the first communication band, the third communication band, and the fourth communication band, and (8) simultaneous transferring using the second communication band, the third communication band, and the fourth communication band. Furthermore, it is possible to perform (9) simultaneous transferring using the first communication band, the second communication band, the third communication band, and the fourth communication band.

It should be noted that transfer circuits 10 and 20 may be disposed on a single mounting board. Furthermore, switch 30 may be also disposed on the above-described mounting board. With this configuration, it is possible to reduce the size of radio frequency circuit 1.

It should be noted that transfer circuits 10 and 20 may each be a circuit capable of performing only one of transmission of a radio frequency signal and reception of a radio frequency signal. In the case where transfer circuit 10 performs only the transmission of a radio frequency signal, low noise amplifiers 14R and 15R, switch 13, and reception filter 12R need not necessarily be included. In addition, in the case where transfer circuit 20 performs only the transmission of a radio frequency signal, low noise amplifiers 24R and 25R, switch 23, and reception filter 22R need not necessarily be included. With this configuration, it is possible to simultaneously transmit the radio frequency signal of the first communication band and the radio frequency signal of the second communication band.

In contrast, in the case where transfer circuit 10 performs only the reception of a radio frequency signal, power amplifiers 14T, 15T, switch 13, and transmission filter 12T need not necessarily be included. In addition, in the case where transfer circuit 20 performs only the reception of a radio frequency signal, power amplifiers 24T, 25T, switch 23, and transmission filter 22T need not necessarily be included. With this configuration, it is possible to simultaneously receive the radio frequency signal of the first communication band and the radio frequency signal of the second communication band.

As described above, the radio frequency signal of the first communication system is, for example, a signal that corresponds to the 4G, and is of a predetermined channel of the communication band used in an evolved universal terrestrial radio access (E-UTRA). It should be noted that, in the specification and the drawings, the E-UTRA may be described as a long term evolution (LTE). The above-described communication band is described as a 4G-LTE communication band, for example.

As described above, the radio frequency signal of the second communication system is, for example, a signal that corresponds to the 5G, and is of a predetermined channel in the communication band used in New Radio (NR). It should be noted that the above-described communication band is described as a 5G-NR communication band, for example. In addition, one of the radio frequency signal of the first communication system and the radio frequency signal of the second communication system may be a signal corresponding to the wireless local area network (WLAN) in conformity to IEEE802.11 that is a wireless LAN standard. In other words, the radio frequency signal of the first communication system may be a signal corresponding to the 4G, and the radio frequency signal of the second communication system may be a signal corresponding to WLAN. Alternatively, the radio frequency signal of the first communication system may be a signal corresponding to WLAN, and the radio frequency signal of the second communication system may be a signal corresponding to the 5G.

The channel bandwidth of the radio frequency signal of the 5G-NR communication band tends to be wider than the channel bandwidth of the radio frequency signal of the 4G-LTE communication band.

In view of the above, with radio frequency circuit 1 according to the present embodiment, power amplifiers 14T, 15T, 24T, and 25T are capable of amplifying the radio frequency signal that has been input, in an amplification mode of envelope tracking (hereinafter referred to as ET).

In a radio frequency circuit including a power amplifier, power consumed by the power amplifier accounts or a large part of power consumed in the radio frequency circuit, and thus increasing an efficiency of the power amplifier is an issue for reducing power consumption. The ET system can be given as an example of the procedure for increasing an efficiency of the power amplifier. The ratio of a peak power to an average power of an input signal of the power amplifier (the peak-to-average power ratio (PAPR)) is high in a modulation system such as the orthogonal frequency division multiplexing (OFDM) used in wireless communications. In order to amplify and transmit such a modulation signal, a bias voltage is applied to an amplification transistor such that the amplification transistor operates in a compressed region in response to an input signal at the time of peak power. More specifically, since the bias voltage is excessive at the time of an average power, the bias voltage is varied according to an input modulation signal of the power amplifier (ET mode), and thereby it is possible to reduce the power consumed by the power amplifier.

In view of the above, for example, when a radio frequency signal of the first communication system is input to power amplifier 14T, bias signal b1 (the first bias signal) is applied to power amplifier 14T. On the other hand, for example, when a radio frequency signal of the second communication system is input to power amplifier 14T, bias signal b2 (the second bias signal) that is different than bias signal b1 is applied to power amplifier 141.

In this manner, since bias signals which differ for different channel bandwidths of radio frequency signals that are input are applied to power amplifiers 14T, 15T, 24T, and 25T, the bias signals are optimized according to the channel bandwidths of the radio frequency signals that are input. Accordingly, it is possible to increase the amplification performance of power amplifiers 14T, 151, 24T, and 25T and reduce the power consumption, as compared to the case where the same bias signal is applied even when the channel bandwidths of the radio frequency signals that are input are different.

It should be noted that, the channel bandwidth of radio frequency signals of the second communication system is wider than the channel bandwidth of radio frequency signals of the first communication system, and thus a change period of amplitude indicated by an inverse number (1/BW) of the channel bandwidth is short, and the PAPR is high.

Accordingly, the PAPR of bias signal b2 and the PAPR of bias signal b1 may be different from each other. For example, the PAPR of bias signal b2 is higher than the PAPR of bias signal b1.

In addition, the tracking degree of bias signal b2 (the second tracking degree) may be different from the tracking degree of bias signal b1 (the first tracking degree). For example, the tracking degree of bias signal b2 (the second tracking degree) may be higher than the tracking degree of bias signal b1 (the first tracking degree).

In this manner, bias signal b2 that has a high tracking property is applied when radio frequency signals of the second communication system whose channel bandwidths are relatively broad are input to power amplifiers 14T, 151, 24T, and 25T, and bias signal b1 that has a low tracking property is applied when radio frequency signals of the first communication system whose channel bandwidths are relatively narrow are input to power amplifiers 14T, 15T, 24T, and 25T. In other words, the bias signal is optimized according to the channel bandwidth of the radio frequency signal that is input. Accordingly, it is possible to reduce the power consumption as compared to the case where the same bias signal b2 is applied even when the channel bandwidths of the radio frequency signals that are input are different. In addition, it is possible to improve distortion characteristics as compared to the case where the same bias signal b1 is applied even when the channel bandwidths of the radio frequency signals that are input are different.

It should be noted that the tracking property (i.e., tracking performance) of a bias voltage for an input power amplitude is responsiveness of the bias voltage to a change in the power amplitude of radio frequency signals that are input to power amplifiers 14T, 15T, 24T, and 25T (or output from power amplifiers 14T, 15T, 24T, and 25T), and corresponds to, for example, a transition period (a rise time or a fall time) at the time of a step response of the bias voltage. In other words, a higher tracking degree is equivalent to quicker responsiveness and a shorter transition period.

More specifically, in radio frequency circuit 1 and communication device 5 according to the present embodiment, when a radio frequency signal of the first communication system that is relatively low in the PAPR is input to the above-described power amplifier, bias signal b1 that is relatively low in the tracking property is applied to the above-described power amplifier. On the other hand, when a radio frequency signal of the second communication system that is relatively high in the PAPR is input to the above-described power amplifier, bias signal b2 that is relatively high in the tracking property is applied to the above-described power amplifier.

The following describes the structural components of communication device 5 other than transfer circuits 10 and 20 with reference again to FIG. 1.

Switch 30 includes antenna terminals 30a (the first antenna terminal) and 30b (the second antenna terminal), and selection terminals 30c (the first selection terminal) and 30d (the second selection terminal). Antenna terminal 30a is connected to antenna 2P, and antenna terminal 30b is connected to antenna 2S. In addition, selection terminal 30c is connected to transmission and reception terminal 110 of transfer circuit 10, and selection terminal 30d is connected to transmission and reception terminal 120 of transfer circuit 20. It should be noted that, although two selection terminals, namely, selection terminals 30c and 30d, have been exemplified above, the total number of selection terminals is not limited to two, and may be three or more.

In switch 30, selection between conduction of antenna terminal 30a with selection terminal 30c and conduction of antenna terminal 30a with selection terminal 30d is exclusively performed, and selection between conduction of antenna terminal 30b with selection terminal 30c and conduction of antenna terminal 30b with selection terminal 30d is exclusively performed.

Switch 30 is, for example, a switching circuit of the double pole double throw (DPDT) type, and includes antenna terminals 30a and 30b and selection terminals 30c and 30d. It should be noted that switch 30 may be a DP3T switching circuit or a DP4T switching circuit. In this case, terminals according to the total number of transmission circuits to be connected are used.

Antenna 2P is one example of the first antenna. Antenna 2P is connected to antenna terminal 30a of switch 30, and emits or receives radio frequency signals. Antenna 2S is one example of the second antenna. Antenna 2S is connected to antenna terminal 30b of switch 30, and emits or receives radio frequency signals.

ET power supply circuit 6 includes 4G ET power supply circuit 61, 5G ET power supply circuit 62, and switching circuit 63. ET power supply circuit 6 outputs, for power amplifiers 14T, 15T, 24T, and 25T, bias signals b1 and b2 for the ET mode, based on a control signal that is output by a controller of RFIC 3.

5G ET power supply 62 outputs, for power amplifiers 14T, 15T, 24T, and 25T, bias signal b2 for the ET mode, based on a control signal that is output by the controller of RFIC 3. 4G ET power supply 61 outputs, for power amplifiers 14T, 15T, 24T, and 25T, bias signal b1 for the ET mode, based on a control signal that is output by the controller of RFIC 3.

4G ET power supply 61 and 5G ET power supply 62 are bias signal supply sources for causing power amplifiers 14T, 15T, 24T, and 25T to operate in an amplification mode according to the ET system. It should be noted that the amplification mode according to the ET system is a mode in which a power amplitude (envelope) of radio frequency input signals (or radio frequency output signals) of power amplifiers 14T, 151, 24T, and 25T are tracked, and bias signals (a direct current bias voltage or a direct current bias current) supplied to power amplifiers 14T, 15T, 24T, and 25T according to the power amplitude are made variable.

Switching circuit 63 is connected to 4G ET power supply 61, 5G ET power supply 62, and power amplifiers 14T, 15T, 24T, and 25T. With this connection configuration, the switching circuit switches between applying bias signal b1 and applying bias signal b2, to power amplifiers 14T, 15T, 24T, and 25T.

It should be noted that, in view of the above-described tracking property, it is desirable that 5G ET power supply 62 is located closer to RFIC 3 than 4G ET power supply 61 is. In this manner, it is possible to relatively shorten a control line connecting RFIC 3 and 5G ET power supply 62, and thus it is possible to improve the tracking property of bias signal b2 that is required to have a higher tracking property than bias signal b1.

In addition, when the tracking property of bias signal b2 (the second tracking degree) is higher than the tracking property of bias signal b1 (the first tracking degree), the tracking property of bias signal b2 that is output from 5G ET power supply 62 is higher than the tracking property of bias signal b1 that is output from 4G ET power supply 61. In order to implement the above, for example, the dynamic range of a bias voltage that is output from 5G ET power supply 62 may be greater than the dynamic range of a bias voltage that is output from 4G ET power supply 61. In addition, for example, a response speed of 5G ET power supply 62 from detecting a control signal from RFIC 3 to outputting a bias voltage may be higher than a response speed of 4G ET power supply 61 from detecting a control signal from RFIC 3 to outputting a bias voltage.

It should be noted that, although ET power supply circuit 6 is disposed outside radio frequency circuit 1 and included in communication device 5 according to the present embodiment in FIG. 1, the present disclosure is not limited to this example. Radio frequency circuit 1 may include ET power supply circuit 6. Furthermore, radio frequency circuit 1 may include switching circuit 63 of ET power supply circuit 6. For example, switching circuit 63 may be disposed on the mounting board of radio frequency circuit 1. The amplification modes of power amplifiers 141, 151, 24T, and 25T are determined on the basis of the supply mode of a bias signal to an amplification transistor included in the above-described power amplifiers. According to the above-described configuration, supply of a bias signal to the above-described power amplifiers are switched by switching circuit 63 included in radio frequency circuit 1, and thus it is possible to implement radio frequency circuit 1 capable of switching between amplification modes with a simplified circuit configuration.

RFIC 3 is an RF signal processing circuit that processes radio frequency signals. More specifically, RFIC 3 performs signal processing, by up-conversion, and the like, on a signal to be transmitted that has been input from BBIC 4, and outputs, to transfer circuits 10 and 20, a radio frequency signal to be transmitted that has been generated by the signal processing. In addition, RFIC 3 includes a controller that outputs, to switches 13, 23, and 30, a control signal for switching connected states of switches 13, 23, and 30, based on a combination of the communication system and the communication band of a radio frequency signal that is to be transferred through radio frequency circuit 1. Furthermore, RFIC 3 outputs the control signal to ET power supply circuit 6, based on a supply of a radio frequency signal of the first communication system to radio frequency circuit 1 and a supply of a radio frequency signal of the second communication system to radio frequency circuit 1.

BBIC 4 is a circuit that performs signal processing using an intermediate frequency band having a lower frequency than a frequency band of the radio frequency signal that is transferred through transfer circuits 10 and 20. The signal processed by BBIC 4 is, for example, used as an image signal for image display or as a sound signal for telephone conversation via a speaker.

RFIC 3 and BBIC 4 are each a signal processing circuit that processes radio frequency signals. The above-described controller may be included in BBIC 4.

It should be noted that, in communication device 5 according to the present embodiment, antennas 2S and 2P, BBIC 4, and ET power supply circuit 6 are not indispensable component.

2. Configurations of Radio Frequency Circuit 1A and Communication Device 5A According to Implemental Example 1

Figure 3:
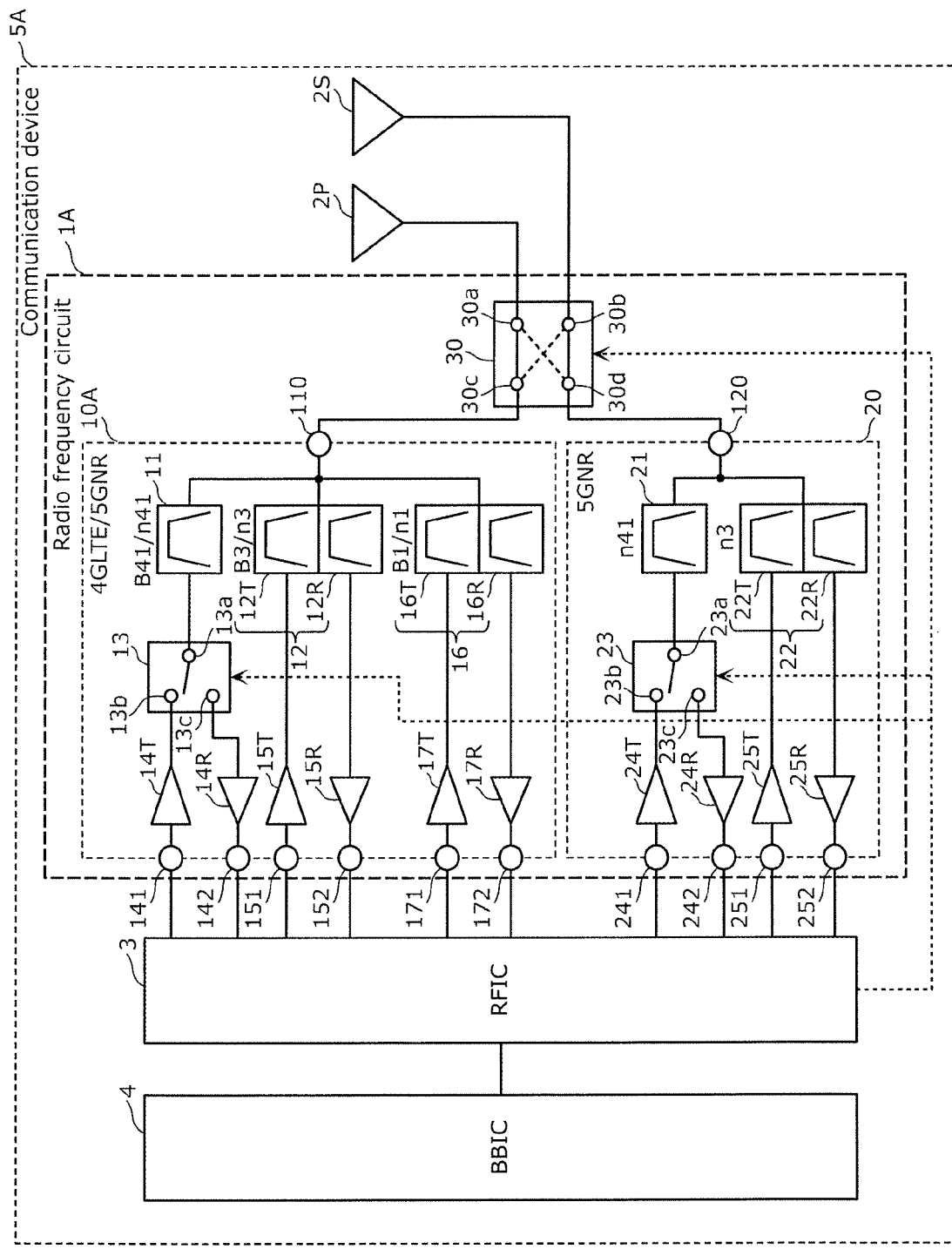
FIG. 3 is a diagram illustrating a circuit configuration of a radio frequency circuit and a communication device according to implemental example 1.

FIG. 3 is a diagram illustrating a circuit configuration of radio frequency circuit 1A and communication device 5A according to implemental example 1. As illustrated in the diagram, communication device 5A includes radio frequency circuit 1A, antennas 2P and 2S, RFIC 3, and BBIC 4. Radio frequency circuit 1A is one implemental example of radio frequency circuit 1 according to the embodiment and communication device 5A is one implemental example of communication device 5 according to the embodiment in FIG. 1, in which the 4G is applied as the first communication system and the 5G is applied as the second communication system. In addition, radio frequency circuit 1A according to implemental example 1 has a configuration different from the configuration of radio frequency circuit 1 according to the embodiment in that duplexer 16, power amplifier 17T, and low noise amplifier 17R are further included. In the following, the description of the configurations of radio frequency circuit 1A and communication device 5A according to implemental example 1 that are the same as the configurations of radio frequency circuit 1 and communication device 5 according to the embodiment will be omitted, and description will be focused on a different configuration.

Radio frequency circuit 1A includes transfer circuits 10A and 20, and switch 30.

Transfer circuit 10A is one example of the first transfer circuit, and transfers radio frequency signals of the 4G that is the first communication system and 5G that is the second communication system. Transfer circuit 10A includes transmission and reception terminal 110, transmission input terminals 141, 151, and 171, reception output terminals 142, 152, and 172, filter 11, duplexers 12 and 16, switch 13, power amplifiers 14T, 151, and 171, and low noise amplifiers 14R, 15R, and 17R.

Filter 11 is one example of the first filter, and transfers a 4G radio frequency signal and a 5G radio frequency signal. More specifically, filter 11 has, as a passband, Band 41 (a band: 2496 MHz to 2690 MHz) stipulated in the evolved universal terrestrial radio access (E-UTRA) of the 4G, and n41 (a band: 2496 MHz to 2690 MHz) stipulated in the new radio (NR) of the 5G.

It should be noted that the communication band stipulated in the E-UTRA of 4G is denoted with "Band", and the communication band stipulated in the NR of 5G is denoted with "n".

Power amplifier 14T and low noise amplifier 14R amplify a radio frequency signal of 4G Band 41 and a radio frequency signal of 5G n41.

Duplexer 12 is one example of the second filter, and transfers a 4G radio frequency signal and a 5G radio frequency signal. Duplexer 12 includes transmission filter 12T and reception filter 12R. More specifically, transmission filter 12T has, as a passband, a transmission band (1710 MHz to 1785 MHz) of Band 3 stipulated in the E-UTRA of the 4G, and a transmission band (1710 MHz to 1785 MHz) of n3 stipulated in the NR of the 5G. Furthermore, reception filter 12R has, as a passband, a reception band (1710 MHz to 1785 MHz) of Band 3 stipulated in the E-UTRA of the 4G, and a reception band (1710 MHz to 1785 MHz) of n3 stipulated in the NR of the 5G.

Power amplifier 15T and low noise amplifier 15R amplify a radio frequency signal of 4G Band 3 and a radio frequency signal of 5G n3.

Transfer circuit 20 is one example of the second transfer circuit, and transfers radio frequency signals of the 5G that is the second communication system Transfer circuit 20 includes: transmission and reception terminal 120; transmission input terminals 241 and 251; reception output terminals 242 and 252; filter 21; duplexer 22; switch 23; power amplifiers 24T and 25T, and low noise amplifiers 24R and 25R.

Filter 21 is one example of the third filter, and transfers 5G radio frequency signals. More specifically, filter 21 has, as a passband, n41 stipulated in the 5G NR. In other words, the passband of filter 21 and the passband of filter 11 overlap each other. It should be noted that filter 11 may have, as a passband, 4G Band 46 (a band: 5.15 GHz to 5.925 GHz), and filter 21 may have, as a passband, 5G NR-U (5.15 GHz to 5.925 GHz). Alternatively, filter 11 may have, as a passband, Band 46 of 4G (a band: 5.15 GHz to 5.925 GHz), and filter 21 may have, as a passband, WLAN (5.15 GHz to 5.85 GHz). Alternatively, the passband of filter 11 may be included in WLAN (5.15 GHz to 7.125 GHz), and the passband of filter 21 may be included in 5G NR-U (5.15 GHz to 7.125 GHz). In this case, the passband of filter 11 and the passband of filter 21 have an overlapping band that falls within a frequency range of from 5.15 GHz to 7.125 GHz. It should be noted that the NR-U is 5G-NR greater than or equal to 5 GHz in the 3rd Generation Partnership Project (3GPP), and corresponds to the communication band U-NII in the unlicensed band in the Federal Communications Commission (FCC).

Power amplifier 24T and low noise amplifier 24R amplify a radio frequency signal of 5G n41.

Duplexer 22 is one example of the fourth filter, and transfers a 5G radio frequency signal. Duplexer 22 includes transmission filter 22T and reception filter 22R. More specifically, transmission filter 22T has, as a passband, a transmission band of n3 stipulated in the 5G NR. In addition, reception filter 22R has, as a passband, a reception band of n3 stipulated in the 5G NR. In other words, the passband of duplexer 22 and the passband of duplexer 12 overlap each other.

Power amplifier 25T and low noise amplifier 25R amplify a radio frequency signal of 5G n3.

Duplexer 16 of transfer circuit 10 is one example of the fifth filter, and has a passband that does not overlap the passbands of filters 11 and 21 and duplexers 12 and 22. Duplexer 16 includes transmission filter 16T and reception filter 16R. The output terminal of transmission filter 16T and the input terminal of reception filter 16R are connected to transmission and reception terminal 110. The input terminal of transmission filter 16T is connected to the output terminal of power amplifier 171, and the output terminal of reception filter 16R is connected to the input terminal of low noise amplifier 17R. More specifically, transmission filter 16T has, as a passband, a transmission band (1920 MHz to 1980 MHz) of Band 1 stipulated in the E-UTRA of the 4G, and a transmission band (1920 MHz to 1980 MHz) of n1 stipulated in the NR of the 5G. Furthermore, reception filter 16R has, as a passband, a reception band (2110 MHz to 2170 MHz) of Band 1 stipulated in the E-UTRA of the 4G, and a reception band (2110 MHz to 2170 MHz) of n1 stipulated in the NR of the 5G. It should be noted that, although duplexer 16 is a filter that transfers 4G radio frequency signals and 5G radio frequency signals according to the present embodiment, duplexer 16 may be a filter that only transfers one of 4G radio frequency signals and 5G radio frequency signals.

Power amplifier 17T amplifies a radio frequency signal that has been input from transmission input terminal 171. Power amplifier 17T is connected between transmission input terminal 171 and the input terminal of transmission filter 16T. Low noise amplifier 17R amplifies a radio frequency signal that has been input from transmission and reception terminal 110. Low noise amplifier 17R is connected between the output terminal of reception filter 16R and reception output terminal 172.

According to the above-described configuration of radio frequency circuit 1A, it is possible to simultaneously transfer 4G radio frequency signals and 5G radio frequency signals. In this case, even when the frequency band of a 4G (E-UTRA) radio frequency signal and the frequency band of a 5G (NR) radio frequency signal partially overlap each other, it is possible to transfer the two radio frequency signals by distributing the two radio frequency signals into different transfer circuits, namely, transfer circuit 10A and transfer circuit 20, and thus the isolation between the two radio frequency signals which are simultaneously transferred is improved. In addition, radio frequency circuit 1A includes two sets of a combination of two filters which correspond to the 4G and the 5G, are disposed in two different transfer circuits, namely, transfer circuit 10A and transfer circuit 20, and have passbands that partially overlap each other. Accordingly, it is possible to select a communication band of radio frequency signals to be simultaneously transferred. In addition, it is possible to simultaneously transfer three or more radio frequency signals. For example, as the combination of simultaneous transfer of two radio frequency signals, it is possible to perform: (1) E-UTRA-NR dual connectivity (EN-DC) between 4G Band 41 and 5G n41; (2) the EN-DC between 4G Band 3 and 5G n3; (3) the EN-DC between 4G Band 3 and 5G n41; (4) the EN-DC between 4G Band 41 and 5G n3; (5) the EN-DC between 4G Band 1 and 5G n41; and (6) the EN-DC of 4G Band 1 and 5G n3. In addition, as the combination of simultaneous transfer of three radio frequency signals, it is possible to perform: (7) simultaneous transfer of 4G Band 41, 4G Band 3, and 5G n41; (8) simultaneous transfer of 4G Band 41; 4G Band 3; and 5G n3; (9) simultaneous transfer of 4G Band 41, 5G Band 41, and 5G n3; (10) simultaneous transfer of 5G n3; 5G n41; and 5G n3; and (11) simultaneous transfer of one of the above-described (1) to (4) and 4G Band 1, etc. Furthermore, (12) it is also possible to perform simultaneous transfer of four or more communication bands, among 4G Band 41, 4G Band 3, 4G Band 1, 5G n41, and 5G n3.

In addition, with the above-described configuration, radio frequency circuit 1A is capable of not only simultaneously transferring a radio frequency signal of the 4G (the first communication system) and a radio frequency signal of the 5G (the second communication system), but also simultaneously transferring two radio frequency signals of the same 5G (the second communication system), by using transfer circuits 10A and 20.

It should be noted that, according to the present implemental example, a filter (duplexer 16) having a passband that does not overlap any of the passbands of the other filters is disposed in transfer circuit 10 that corresponds to the 4G (the first communication system). Such a filter that has a passband not overlapping any of the passbands of the other filters, and causes radio frequency signals involving no deterioration in isolation to pass through when simultaneous transfer is performed may all be disposed in transfer circuit 10.

Non-Standalone-New Radio (NSA-NR) that is a communication architecture that has been being introduced in recent years is a communication architecture which creates a communication area of the 5G (NR) in a communication area of the 4G (E-UTRA), and performs communication control on both of the 5G (NR) and the 4G (E-UTRA) by a control channel of the 4G side. Accordingly, NSA-NR relies on simultaneously connecting the 4G transfer circuit and the 5G transfer circuit to the communication line, with the 4G (E-UTRA) being the master and the 5G (NR) being the slave (EN-DC). In order to optimize the communication environment of EN-DC, for example, transfer circuit 10A for the 4G (E-UTRA) may be connected to an antenna having a high antenna sensitivity, and transfer circuit 20 for the 5G (NR) may be connected to an antenna having a low antenna sensitivity.

In view of the above, it is possible to improve the communication environment in EN-DC, by disposing a filter that causes radio frequency signals involving no deterioration in isolation to pass through when simultaneous transfer is performed, on transfer circuit 10 having a better communication environment.

It should be noted that the passband (4G Band 41 and 5G n41) of filter 11 (the first filter) and the passband (5G n41) of filter 21 (the third filter) are same according to the present implemental example, the present disclosure is not limited to this example. It is sufficient if the passband of filter 11 (the first filter) and the passband of filter 21 (the third filter) at least partially overlap each other. In addition, the passband (4G Band 3 and 5G n3) of duplexer 12 (the second filter) and the passband (5G n3) of duplexer 22 (the fourth filter) are same according to the present implemental example, the present disclosure is not limited to this example. It is sufficient if the passband of duplexer 12 (the second filter) and the passband of duplexer 22 (the fourth filter) at least partially overlap each other.

It should be noted that communication device 5A according to the present implemental example may include ET power supply circuit 6 as with communication device 5 according to the embodiment in FIG. 1.

3. Configurations of Radio Frequency Circuit 1B and Communication Device 5B According to Implemental Example 2

Figure 4:
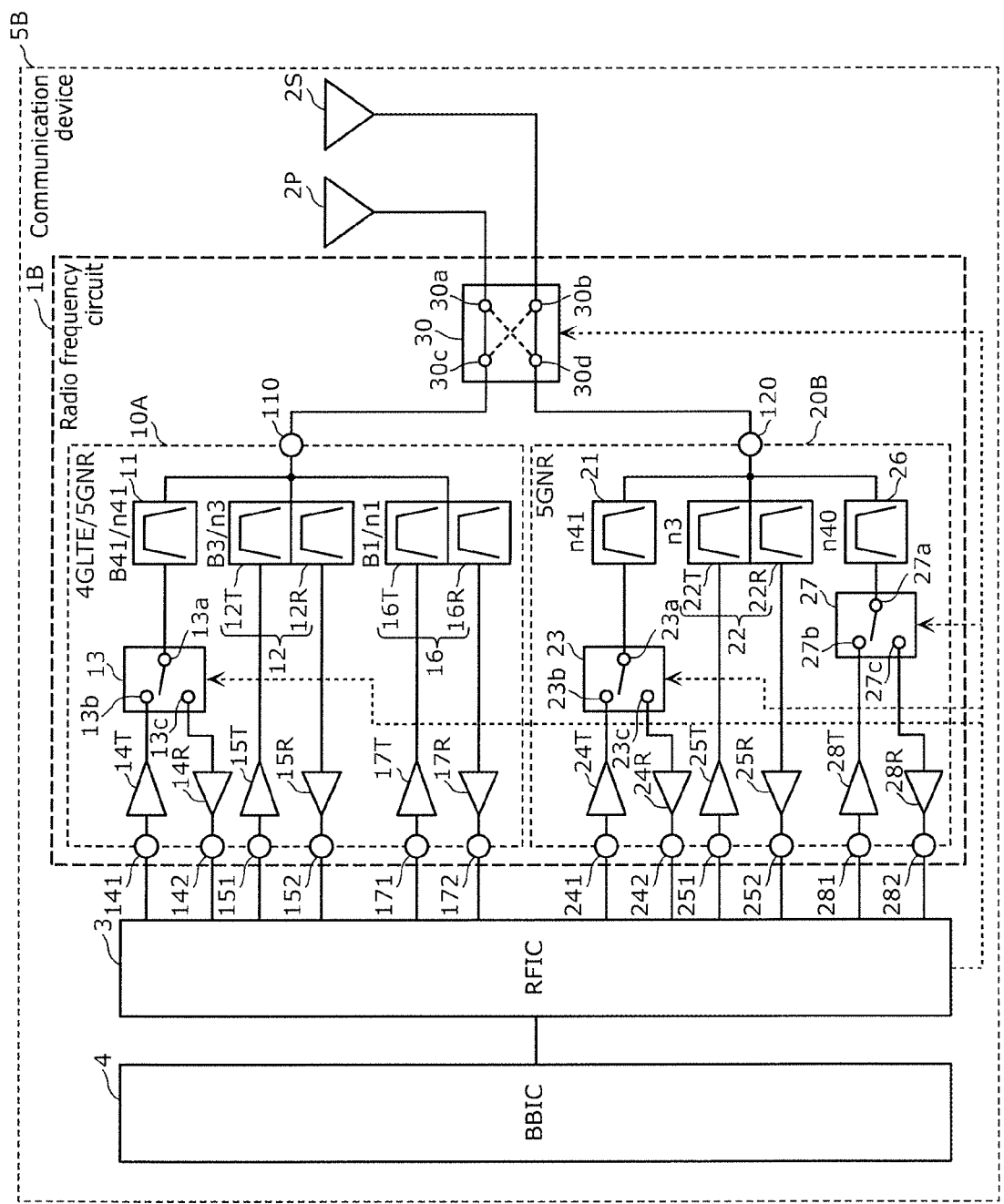
FIG. 4 is a diagram illustrating a circuit configuration of a radio frequency circuit and a communication device according to implemental example 2.

FIG. 4 is a diagram illustrating a circuit configuration of radio frequency circuit 1B and communication device 5B according to implemental example 2. As illustrated in the diagram, communication device 5B includes radio frequency circuit 1B, antennas 2P and 2S, RFIC 3, and BBIC 4. Radio frequency circuit 1B is one implemental example of radio frequency circuit 1 according to the embodiment in FIG. 1 and communication device 5B is one implemental example of communication device 5 according to the embodiment in FIG. 1, in which the 4G is applied as the first communication system and the 5G is applied as the second communication system. In addition, radio frequency circuit 1B according to implemental example 2 has a configuration different from the configuration of radio frequency circuit 1A according to implemental example 1 in that filter 26, switch 27, power amplifier 28T, and low noise amplifier 28R are further included. In the following, description of the configurations of radio frequency circuit 1B and communication device 5B according to implemental example 2 that are the same as the configurations of radio frequency circuit 1A and communication device 5A according to implemental example 1 will be omitted, and description will be focused on a different configuration.

Radio frequency circuit 1B includes transfer circuits 10A and 20B, and switch 30.

Transfer circuit 20B is one example of the second transfer circuit, and transfers radio frequency signals of the 5G that is the second communication system Transfer circuit 20B includes: transmission and reception terminal 120; transmission input terminals 241, 251, and 281; reception output terminals 242, 252, and 282; filters 21 and 26; duplexer 22; switches 23 and 27; power amplifiers 24T, 25T, and 28T; and low noise amplifiers 24R, 25R, and 28R.

Filter 26 transfers 5G radio frequency signals. More specifically, filter 26 has, as a passband, n40 (a band: 2300 MHz to 2400 MHz) stipulated in the 5G NR, and is connected between transmission and reception terminal 120 and common terminal 27a.

Switch 27 is a switch for switching between transmission and reception, and includes common terminal 27a and selection terminals 27b and 27c. Switch 27 alternately switches between connecting common terminal 27a to selection terminal 27b and connecting common terminal 27a to selection terminal 27c.

Power amplifier 28T amplifies a radio frequency signal that has been input from transmission input terminal 281. Power amplifier 28T is connected between transmission input terminal 281 and selection terminal 27b.

Low noise amplifier 28R amplifies a radio frequency signal that has been input from transmission and reception terminal 120. Low noise amplifier 28R is connected between selection terminal 27c and reception output terminal 282.

With the above-described configuration, when common terminal 27a and selection terminal 27b are connected to each other, a radio frequency signal that has been amplified by power amplifier 28T passes through switch 27 and filter 26 and is output from transmission and reception terminal 120. In addition, when common terminal 27a and selection terminal 27c are connected to each other, a radio frequency signal that has been input from transmission and reception terminal 120 and has passed through filter 26 and switch 27 is amplified by low noise amplifier 28R and output from reception output terminal 282. More specifically, transfer circuit 20B executes the transmission and reception of the radio frequency signals of the 5G n40 in the TDD system, through the switching operation performed by switch 27. Filter 26 is, for example, a TDD filter having, as a passband, the 5G n40 that corresponds to the TDD system.

According to the above-described configuration of radio frequency circuit 1A, it is possible to simultaneously transfer a radio frequency signal of the 4G and a radio frequency signal of the 5G. In this case, even when the frequency band of a 4G (E-UTRA) radio frequency signal and the frequency band of a 5G (NR) radio frequency signal partially overlap each other, it is possible to distribute the two radio frequency signals into different transfer circuits, namely, transfer circuit 10A and transfer circuit 20B, and transfer the two radio frequency signals, and thus the isolation between the two radio frequency signals simultaneously transferred is improved. In addition, radio frequency circuit 1B includes two sets of a combination of two filters which correspond to the 4G and the 5G, and are disposed in two different transfer circuits, namely, transfer circuit 10A and transfer circuit 20B, and have passbands that partially overlap. Accordingly, it is possible to select a communication band of radio frequency signals to be simultaneously transferred. In addition, it is possible to simultaneously transfer three or more radio frequency signals. For example, as the combination of simultaneous transfer of two radio frequency signals, it is possible to perform: (1) the EN-DC between 4G Band 41 and 5G n41; (2) the EN-DC between 4G Band 3 and 5G n3; (3) the EN-DC between 4G Band 3 and 5G n41; (4) the EN-DC between 4G Band 41 and 5G n3; (5) the EN-DC between 4G Band 1 and 5G n41; (6) the EN-DC of 4G Band 1 and 5G n3; (7) the EN-DC between 4G Band 41 and 5G n40; (8) the EN-DC between 4G Band 3 and 5G n40, etc. In addition, as the combination of simultaneous transfer of three radio frequency signals, it is possible to perform: (9) simultaneous transfer of 4G Band 41, 4G Band 3, and 5G n41; (10) simultaneous transfer of 4G Band 41; 4G Band 3; and 5G n3; (11) simultaneous transfer of 4G Band 41, 5G Band 41, and 5G n3; (12) simultaneous transfer of 5G n3; 5G n41; and 5G n3; (13) simultaneous transfer of one of the above-described (1) to (4) and 4G Band 1 or 5G n40, and the like. Furthermore, (14) it is also possible to perform simultaneous transfer of four or more communication bands from among 4G Band 41, 4G Band 3, 4G Band 1, 5G n41, 5G n3, and 5G n40.

In addition, with the above-described configuration, radio frequency circuit 1B is capable of not only simultaneously transferring a radio frequency signal of the 4G (the first communication system) and a radio frequency signal of the 5G (the second communication system), but also simultaneously transferring two radio frequency signals of the same 5G (the second communication system), by using transfer circuits 10A and 20B.

Here, in transfer circuit 10A, filter 11 is a TDD filter, and duplexers 12 and 16 are FDD filters. In addition, in transfer circuit 20B, filters 21 and 26 are TDD filters, and duplexer 22 is an FDD filter.

More specifically, the total number of filters (e.g., two in FIG. 4) included in transfer circuit 20B each of which has, as a passband, a communication band that corresponds to the TDD system is greater than the total number of filters (e.g., one in FIG. 4) included in transfer circuit 10A each of which has, as a passband, a communication band that corresponds to the TDD system.

In general, a communication band that corresponds to the TDD system tends to be located on the higher-frequency side relative to a communication band that corresponds to the FDD system. Accordingly, it is possible to implement transfer circuit 10A as, for example, a circuit corresponding to the communication band on a lower-frequency side that mostly corresponds to the E-UTRA, and to implement transfer circuit 20B as, for example, a circuit corresponding to the communication band on a higher-frequency side that mostly corresponds to the NR.

In addition, the total number of filters (e.g., two in FIG. 4) included in transfer circuit 20B each of which has, as a passband, a communication band that corresponds to the TDD system is greater than the total number of filters (e.g., one in FIG. 4) included in transfer circuit 20B each of which has, as a passband, a communication band that corresponds to the FDD system.

With this configuration, it is possible to implement transfer circuit 20B as, for example, a circuit corresponding to the communication band on the higher-frequency side that mostly corresponds to the NR.

It should be noted that the passband (4G Band 41 and 5G n41) of filter 11 (the first filter) and the passband (5G n41) of filter 21 (the third filter) are the same according to the present implemental example 2, the present disclosure is not limited to this example. It is sufficient if the passband of filter 11 (the first filter) and the passband of filter 21 (third filter) at least partially overlap each other. In addition, the passband (4G Band 3 and 5G n3) of duplexer 12 (the second filter) and the passband (5G n3) of duplexer 22 (the fourth filter) are the same according to the present implemental example 2, the present disclosure is not limited to this example. It is sufficient if the passband of duplexer 12 (the second filter) and the passband of duplexer 22 (the fourth filter) at least partially overlap each other.

It should be noted that, although transfer circuit 10A transfers 4G radio frequency signals and 5G radio frequency signals and transfer circuit 20 (20B) transfers 5G radio frequency signals in radio frequency circuit 1A according to implemental example 1 and radio frequency circuit 1B according to implemental example 2, transfer circuit 20 (20B) may also transfer both 4G radio frequency signals and 5G radio frequency signals.

It should be noted that communication device 5B according to the present implemental example may include ET power supply circuit 6 as with communication device 5 according to the embodiment in FIG. 1.

4. Configurations of Radio Frequency Circuit 1C and Communication Device 5C According to Implemental Example 3

Figure 5:
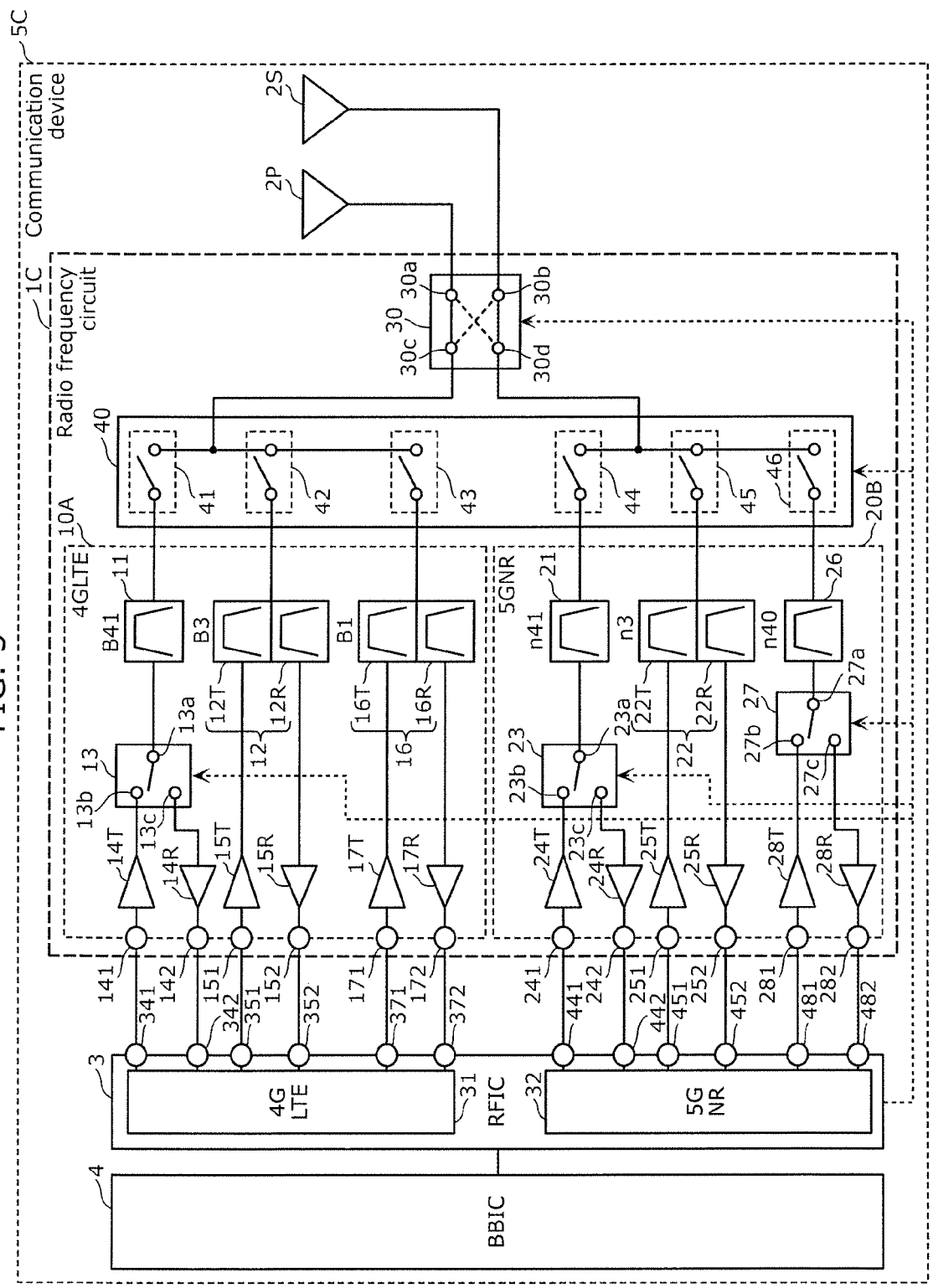
FIG. 5 is a diagram illustrating a circuit configuration of a radio frequency circuit and a communication device according to Implemental example 3.

FIG. 5 is a diagram illustrating a circuit configuration of radio frequency circuit 1C and communication device 5C according to implemental example 3. As illustrated in the diagram, communication device 5C includes radio frequency circuit 1C, antennas 2P and 2S, RFIC 3, and BBIC 4. Radio frequency circuit 1C is one implemental example of radio frequency circuit 1 according to the embodiment and communication device 5C is one implemental example of communication device 5 according to the embodiment, in which the 4G is applied as the first communication system and the 5G is applied as the second communication system. Radio frequency circuit 1C and communication device 5C according to the present implemental example 3 are different from radio frequency circuit 1B and communication device 5B according to implemental example 2 in that an internal structure of RFIC 3 is disclosed and switching circuit 40 is further included, and in the communication system assigned to transfer circuit 10A. In the following, description of the configurations of radio frequency circuit 1C and communication device 5C according to the present implemental example 3 that are the same as the configurations of radio frequency circuit 1B and communication device 5B according to implemental example 2 will be omitted, and description will be focused on a different configuration.

Radio frequency circuit 1C includes transfer circuits 10A and 20B, switch 30, and switching circuit 40. Radio frequency circuit 1C according to the present implemental example 3 is different from radio frequency circuit 1B according to implemental example 2 in that switching circuit 40 is further included, and that transfer circuit 10A transfers only 4G radio frequency signals out of 4G and 5G radio frequency signals.

Transfer circuit 10A is one example of the first transfer circuit, and transfers only radio frequency signals of the 4G, out of the 4G that is the first communication system and the 5G that is the second communication system.

Filter 11 is one example of the first filter, and transfers 4G radio frequency signals. More specifically, filter 11 has, as a passband, Band 41 stipulated in the 4G E-UTRA.

Power amplifier 14T and low noise amplifier 14R amplify radio frequency signals of 4G Band 41.

Duplexer 12 is one example of the second filter, and transfers 4G radio frequency signals. Duplexer 12 includes transmission filter 12T and reception filter 12R. More specifically, transmission filter 12T has, as a passband, a transmission band of Band 3 stipulated in the 4G E-UTRA. In addition, reception filter 12R has, as a passband, a reception band of Band 3 stipulated in the 4G E-UTRA.

Power amplifier 15T and low noise amplifier 15R amplify radio frequency signals of 4G Band 3.

Duplexer 16 is one example of the fifth filter, and transfers 4G radio frequency signals. Duplexer 16 includes transmission filter 16T and reception filter 16R. Transmission filter 16T and reception filter 16R each have a passband that does not overlap the passbands of filters 11 and 21 and duplexers 12 and 22. More specifically, transmission filter 16T has, as a passband, a transmission band of Band 1 stipulated in the 4G E-UTRA. In addition, reception filter 16R has, as a passband, a reception band of Band 1 stipulated in the 4G E-UTRA.

Power amplifier 17T and low noise amplifier 17R amplify radio frequency signals that have been input to transmission and reception terminal 110. Low noise amplifier 17R amplifies a radio frequency signal of 4G Band 1.

According to the above-described configuration of radio frequency circuit 1C, it is possible to simultaneously transfer a 4G radio frequency signal and a 5G radio frequency signal. In this case, even when the frequency band of a 4G (E-UTRA) radio frequency signal and the frequency band of a 5G (NR) radio frequency signal partially overlap each other, it is possible to distribute the two radio frequency signals into different transfer circuits, namely, transfer circuit 10A and transfer circuit 20B, and transfer the two radio frequency signals, and thus the isolation between the two radio frequency signals simultaneously transferred is improved. In addition, radio frequency circuit 1B includes two sets of a combination of two filters which correspond to the 4G and the 5G, are disposed in two different transfer circuits, namely, transfer circuit 10A and transfer circuit 20B, and have passbands that partially overlap each other. Accordingly, it is possible to select a communication band of radio frequency signals to be simultaneously transferred.

In addition, it is possible to simultaneously transfer three or more radio frequency signals.

Switching circuit 40 is disposed between switch 30 and transfer circuit 10A, and between switch 30 and transfer circuit 20B. Switching circuit 40 includes switches 41, 42, 43, 44, 45, and 46. Switch 41 switches between connecting and disconnecting of filter 11 with selection terminal 30c. Switch 42 switches between connecting and disconnecting of duplexer 12 with selection terminal 30c. Switch 43 switches between connecting and disconnecting of duplexer 16 with selection terminal 30c. In addition, switch 44 switches between connecting and disconnecting of filter 21 with selection terminal 30d. Switch 45 switches between connecting and disconnecting of duplexer and selection terminal 30d. Switch 46 switches between connecting and disconnecting of duplexer 26 and selection terminal 30d.

For example, when a radio frequency signal of 4G Band 41 and a radio frequency signal of 4G Band 3 are simultaneously transmitted, switches 41 and 42 are placed in a conducting state, and switch 43 is placed in a non-conducting state. In addition, for example, when a radio frequency signal of the 5G n41 and a radio frequency signal of 5G n3 are simultaneously transmitted, switches 44 and 45 are placed in a conducting state, and switch 46 is placed in a non-conducting state. With switching circuit 40 being included, it is possible to improve the isolation between radio frequency signals simultaneously transferred in transfer circuit 10A, and the isolation between radio frequency signals simultaneously transferred in transfer circuit 20B.

It should be noted that switching circuit 40 need not be included in radio frequency circuit 1C according to the present implemental example. In addition, switching circuit 40 according to the present implemental example may be included in radio frequency circuit 1A according to implemental example 1 and radio frequency circuit 1B according to implemental example 2.

Furthermore, in communication device 5C according to the present implemental example, RFIC 3 includes 4G signal processing circuit 31 and 5G signal processing circuit 32.

4G signal processing circuit 31 is a circuit that generates a 4G radio frequency signal and 5G signal processing circuit 32 is a circuit that generates a 5G radio frequency signal. It should be noted that the 4G radio frequency signal and 5G radio frequency signal are different from each other in terms of, for example, a modulation system, a signal band width (per one channel), a peak to average power ratio (PAPR), etc.

RFIC 3 includes output terminals 341, 342, 351, 352, 371, and 372 each of which outputs only a radio frequency signal of the 4G out of the 4G and the 5G. Output terminals 341, 342, 351, 352, 371, and 372 are each one example of the first output terminal, and connected to 4G signal processing circuit 31. In the present implemental example, output terminal 341 is connected to transmission input terminal 141, output terminal 342 is connected to reception output terminal 142, output terminal 351 is connected to transmission input terminal 151, output terminal 352 is connected to reception output terminal 152, output terminal 371 is connected to transmission input terminal 171, and output terminal 372 is connected to reception output terminal 172.

In addition, RFIC 3 includes output terminals 441, 442, 451, 452, 481, and 482 each of which outputs only a radio frequency signal of the 5G out of the 4G and the 5G. Output terminals 441, 442, 451, 452, 481, and 482 are each one example of the first output terminal, and connected to 5G signal processing circuit 32. In the present implemental example, output terminal 441 is connected to transmission input terminal 241, output terminal 442 is connected to reception output terminal 242, output terminal 451 is connected to transmission input terminal 251, output terminal 452 is connected to reception output terminal 252, output terminal 481 is connected to transmission input terminal 281, and output terminal 482 is connected to reception output terminal 282.

It should be noted that, in radio frequency circuit 1C according to the present implemental example, transfer circuits 10A and 20B may be disposed on a single mounting board, or may be realized as a single chip.

With the above-described configuration of RFIC 3, by appropriately connecting the output terminals of RFIC 3 to the transfer circuits of radio frequency circuit 1C that is realized as a single module, it is possible to provide communication device 5C that is downsized and capable of implementing the EN-DC using the 4G and the 5G.

It should be noted that, when signal paths included in transfer circuits 10A and 20B transfer radio frequency signals of both of the 4G and the 5G, the signal paths may be connected to output terminals of RFIC 3 that can output radio frequency signals of both 4G and 5G. The output terminals of RFIC 3 that can output radio frequency signals of both of the 4G and the 5G are terminals that can be connected to each of 4G signal processing circuit 31 and 5G signal processing circuit 32. In this case, RFIC 3 may include, for example, a switch that switches between connecting the above-described terminals to 4G signal processing circuit 31 and connecting the above-described terminals to 5G signal processing circuit 32.

It should be noted that the passband (4G Band 41 and 5G n41) of filter 11 (the first filter) and the passband (5G n41) of filter 21 (the third filter) are the same according to the present implemental example, the present disclosure is not limited to this example. It is sufficient if the passband of filter 11 (the first filter) and the passband of filter 21 (the third filter) at least partially overlap each other. In addition, the passband (4G Band 3 and 5G n3) of duplexer 12 (the second filter) and the passband (5G n3) of duplexer 22 (the fourth filter) are the same according to the present implemental example, the present disclosure is not limited to this example. It is sufficient if the passband of duplexer 12 (the second filter) and the passband of duplexer 22 (the fourth filter) at least partially overlap each other.

It should be noted that communication device 5C according to the present implemental example may include ET power supply circuit 6 as with communication device 5 according to the embodiment in FIG. 1.

As described above, according to the foregoing embodiments, radio frequency circuit 1 transfers a radio frequency signal of the first communication system and a radio frequency signal of the second communication system that is different from the first communication system, and includes: transfer circuit 10 that includes filter 11 and duplexer 12; and transfer circuit 20 that includes filter 21 and duplexer 22. The passband of filter 11 and the passband of filter 21 at least partially overlap each other. The passband of duplexer 12 and the passband of duplexer 22 at least partially overlap each other. Filter 11 transfers a radio frequency signal of the first communication system, and filer 21 transfers a radio frequency signal of the second communication system. Duplexer 12 transfers a radio frequency signal of one of the first communication system and the second communication system. Duplexer 22 transfers a radio frequency signal of the other of the first communication system and the second communication system.

According to the above-described configuration, it is possible to simultaneously transfer a radio frequency signal of the first communication system and a radio frequency signal of the second communication system. In this case, even when the frequency band of the radio frequency signal of the first communication system and the frequency band of the radio frequency signal of the second communication system partially overlap, it is possible to transfer the radio frequency signal of the first communication system and the radio frequency signal of the second communication system by distributing the two signals into different transfer circuits, namely, transfer circuit 10 and transfer circuit 20, and thus the isolation between the two radio frequency signals that are simultaneously transferred can be improved. In addition, radio frequency circuit 1 includes two sets of a combination of two filters which correspond to two different communication systems and are disposed in two different transfer circuits 10 and 20, and have passbands that partially overlap each other. Accordingly, it is possible to select a communication band of radio frequency signals to be simultaneously transferred. In addition, it is possible to simultaneously transfer three or more radio frequency signals.

In addition, a radio frequency signal of the first communication system that passes through filter 11 and a radio frequency signal of the second communication system that passes through filter 21 may be simultaneously transferred, and a radio frequency signal of one of the first communication system and the second communication system that passes through duplexer 12 and a radio frequency signal of the other of the first communication system and the second communication system that passes through duplexer 22 may be simultaneously transferred.

In this manner, even when the frequency band of the radio frequency signal of the first communication system and the frequency band of the radio frequency signal of the second communication system partially overlap each other, it is possible to distribute the two signals into different transfer circuits, namely, transfer circuit 10 and transfer circuit 20, and simultaneously transfer the radio frequency signal of the first communication system and the radio frequency signal of the second communication system.

In addition, filter 11 may transfer a radio frequency signal of the first communication system and a radio frequency signal of the second communication system, and duplexer 12 may transfer a radio frequency signal of the first communication system and a radio frequency signal of the second communication system.

According to the above-described configuration, radio frequency circuit 1 is capable of not only simultaneously transferring a radio frequency signal of the 4G (the first communication system) and a radio frequency signal of the 5G (the second communication system), but also simultaneously transferring two radio frequency signals of the same 5G (the second communication system), by using transfer circuits 10A and 20.

In addition, in radio frequency circuit 1C, filter 11 and duplexer may transfer only the radio frequency signal of the first communication system out of the first communication system and the second communication system. Filer 21 and duplexer 22 may transfer only the radio frequency signal of the second communication system out of the first communication system and the second communication system. The radio frequency signal of the first communication system that passes through filter 11 and the radio frequency signal of the second communication system that passes through filter 21 may be simultaneously transferred. The radio frequency signal of the first communication system that passes through duplexer 12 and the other radio frequency signal of the second communication system that passes through duplexer 22 may be simultaneously transferred.

According to the above-described configuration, it is possible to simultaneously transfer two radio frequency signals of different communication systems.

In addition, in radio frequency circuits 1A, 1B, and 1C, transfer circuit 10A may further include duplexer 16 having a passband that does not overlap the passbands of filters 11 and 21, and duplexers 12 and 22.

According to the above-described configuration, it is possible to improve the communication environment in EN-DC, by disposing duplexer 16 that causes radio frequency signals involving no deterioration in the isolation when simultaneous transfer is performed to pass through, on transfer circuit 10A having a better communication environment.

In addition, transfer circuit 10 may further include power amplifier 14T connected to filter 11 and power amplifier 15T connected to duplexer 12. Transfer circuit 20 may further include power amplifier 24T connected to filter 21, and power amplifier 25T connected to duplexer 22. When a radio frequency signal of the first communication system is input to one power amplifier among power amplifiers 14T, 15T, 24T, and 25T, bias signal b1 may be applied to the one power amplifier. When a radio frequency signal of the second communication system is input to the one power amplifier, bias signal b2 that is different from bias signal b1 may be applied to the one power amplifier.

In this manner, since bias signals which differ for different bandwidths of radio frequency signals that are input are applied to the one power amplifier, the bias signals can be optimized according to the bandwidths of the radio frequency signals that are input. Accordingly, it is possible to increase the amplification performance of the above-described one power amplifier and reduce the power consumption, as compared to the case where the same bias signal is applied even when the bandwidth of the radio frequency signal that is input varies. In this manner, it is possible to ensure high amplification performance and low power consumption when a plurality of radio frequency signals having different bandwidth are transferred.

In addition, the PAPR of bias signal b2 may be different than the PAPR of bias signal b1.

In this manner, since bias signals having PAPRs which are different according to the bandwidths of radio frequency signals that are input are applied to the one power amplifier, the bias signals can be optimized according to the bandwidths of the radio frequency signals that are input. In this manner, it is possible to ensure high amplification performance and low power consumption when a plurality of radio frequency signals having different bandwidth are transferred.

In addition, the bias voltage of bias signal b1 may vary, with the first tracking degree, in accordance with the change of a power amplitude of a radio frequency signal of the first communication system, the bias voltage of bias signal b2 may vary, with the second tracking degree, in accordance with the change of a power amplitude of a radio frequency signal of the second communication system, and the second tracking degree may be higher than the first tracking degree.

In addition, radio frequency circuit 1 or communication device 5 may further include switching circuit 63 that switches between applying bias signal b1 to the above-described one power amplifier and applying bias signal b2 to the above-described one power amplifier.

In addition, the first communication system may be 4G and the second communication system may be 5G.

With this, it is possible to perform simultaneously transfer using the 4G and the 5G (EN-DC) with high isolation being ensured. In addition, the first communication system may be the 4G and the second communication system may be the WLAN.

In addition, the first communication system may be the WLAN and the second communication system may be the 5G.

Furthermore, in transfer circuit 20B, the total number of filters each of which has, as a passband, a communication band that corresponds to the TDD system may be greater than the total number of filters each of which has, as a passband, a communication band that corresponds to the FDD system.

In general, a communication band that corresponds to the TDD system tends to be located on the higher-frequency side than a communication band that corresponds to the FDD system.

Accordingly, it is possible to implement transfer circuit 20B as, for example, a circuit corresponding to the communication band on the higher-frequency side such as the NR.

Furthermore, the total number of filters included in transfer circuit 20B each of which has, as a passband, a communication band that corresponds to the TDD system may be greater than the total number of filters included in transfer circuit 10A each of which has, as a passband, a communication band that corresponds to the TDD system.

With this configuration, it is possible to implement transfer circuit 10A as, for example, a circuit corresponding to the communication band on a lower-frequency side such as the E-UTRA, and to implement transfer circuit 20B as, for example, a circuit corresponding to the communication band on a higher-frequency side such as the NR.

In addition, radio frequency circuit 1 may further include switch 30 that includes antenna terminal 30a connected to antenna 2P, antenna terminal 30b connected to antenna 2S, and selection terminals 30c and 30d. Selection terminal 30c may be connected to transfer circuit 10, selection terminal 30d may be connected to transfer circuit 20. Antenna terminal 30b and selection terminal 30d may be connected when antenna terminal 30a and selection terminal 30c are connected to each other, and antenna terminal 30b and selection terminal 30c may be connected when antenna terminal 30a and selection terminal 30d are connected.

With the above-described configuration, transfer circuit 10 and transfer circuit 20 are connected respectively to individual antennas 2P and 2S, and thus it is possible to improve the isolation between a radio frequency signal transferred through transfer circuit 10 and a radio frequency signal transferred through transfer circuit 20.

In addition, communication device 5 includes RFIC 3 that processes a radio frequency signal to be transmitted by an antenna or a radio frequency signal received by the antenna, and radio frequency circuit 1 that transfers radio frequency signals between the antennas and RFIC 3

With the above-described configuration, it is possible to provide communication device 5 which, when radio frequency signals of a plurality of communication systems are simultaneously transferred, suppresses deterioration in the isolation between signals.

In addition, in communication device 5C, transfer circuit 10A and transfer circuit 20B may be disposed on a single mounting board, or realized as a single chip. RFIC 3 may be connected to radio frequency circuit 1C, and include: output terminals 341, 342, 351, 352, 371, and 372 that output only radio frequency signals of the first communication system out of the first communication system and the second communication system; and output terminals 441, 442, 451, 452, 481, and 482 that output only radio frequency signals of the second communication system out of the first communication system and the second communication system.

With the above-described configuration, by appropriately connecting the output terminals of RFIC 3 to transfer circuits 10A and 20B of radio frequency circuit 1C that is realized as a single module, it is possible to provide communication device 5C that is downsized and capable of implementing the EN-DC using the 4G and the 5G.

Other Embodiments

Although the radio frequency circuit and the communication device according to the present disclosure have been described above based on the embodiment and the implemental examples, the radio frequency circuit and the communication device according to the present disclosure are not limited to the foregoing embodiment and the implemental examples. The present disclosure also encompasses other embodiments achieved by combining arbitrary structural components in the above-described embodiment and the implemental examples, variations resulting from various modifications to the above-described embodiment and the implemental examples that may be conceived by those skilled in the art without departing from the essence of the present disclosure, and various devices that include the radio frequency circuit and the communication device according to the above embodiment and the implemental examples.

Furthermore, for example, in the radio frequency circuit and the communication device according to the foregoing embodiment and the implemental examples, another radio frequency circuit element and wiring, for example, may be inserted in a path connecting circuit elements and a signal path which are disclosed in the drawings.

In addition, the controller according to the present disclosure may be realized as an integrated circuit (IC) or large scale integration (LSI). Furthermore, the method of implementation of structural components using an integrated circuit may be realized using a dedicated circuit or a general-purpose processor. A field programmable gate array (FPGA) that allows for programming after the manufacture of an LSI, or a reconfigurable processor that allows for reconfiguration of the connection and the setting of circuit cells inside an LSI may be employed. In the future, with advancement in semiconductor technology, a brand-new technology may replace LSI. The functional blocks can be integrated using such a technology.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be widely used in communication apparatuses such as a mobile phone, as a radio frequency circuit and a communication device that simultaneously transfer radio frequency signals of two or more different communication systems.

The invention claimed is:

1. A radio frequency circuit configured to transfer a radio frequency signal of a first communication system and a radio frequency signal of a second communication system, the second communication system being different than the first communication system, the radio frequency circuit comprising:
   a first transfer circuit comprising a first filter and a second filter; and
   a second transfer circuit comprising a third filter and a fourth filter, wherein
   a passband of the first filter and a passband of the third filter at least partially overlap each other,
   a passband of the second filter and a passband of the fourth filter at least partially overlap each other,
   the first filter is configured to transfer the radio frequency signal of the first communication system,
   the third filter is configured to transfer the radio frequency signal of the second communication system,
   the second filter is configured to transfer one of the radio frequency signal of the first communication system or the radio frequency signal of the second communication system, and
   the fourth filter is configured to transfer the other of the radio frequency signal of the first communication system or the radio frequency signal of the second communication system.

2. The radio frequency circuit according to claim 1, wherein
   a radio frequency signal of the first communication system that passes through the first filter and a radio frequency signal of the second communication system that passes through the third filter are simultaneously transferred, and
   the one of the radio frequency signal of the first communication system or the radio frequency signal of the second communication system that passes through the second filter and the other of the radio frequency signal of the first communication system or the radio frequency signal of the second communication system that passes through the fourth filter, are simultaneously transferred.

3. The radio frequency circuit according to claim 1, wherein
   the first filter is configured to transfer a radio frequency signal of the first communication system and a radio frequency signal of the second communication system, and
   the second filter is configured to transfer a radio frequency signal of the first communication system and a radio frequency signal of the second communication system.

4. The radio frequency circuit according to claim 1, wherein
   the first filter and the second filter are configured to transfer only a radio frequency signal of the first communication system out of the first communication system and the second communication system,
   the third filter and the fourth filter are configured to transfer only a radio frequency signal of the second communication system out of the first communication system and the second communication system,
   a radio frequency signal of the first communication system that passes through the first filter and a radio frequency signal of the second communication system that passes through the third filter are simultaneously transferred, and
   a radio frequency signal of the first communication system that passes through the second filter and a radio frequency signal of the second communication system that passes through the fourth filter are simultaneously transferred.

5. The radio frequency circuit according to claim 1, wherein
the first transfer circuit further comprises:
a fifth filter having a passband not overlapping a passband of any of the first filter, the second filter, the third filter, or the fourth filter.

6. The radio frequency circuit according to claim 1, wherein
the first transfer circuit further comprises:
a first power amplifier connected to the first filter; and
a second power amplifier connected to the second filter,
the second transfer circuit further comprises:
a third power amplifier connected to the third filter; and
a fourth power amplifier connected to the fourth filter,
when a radio frequency signal of the first communication system is input to one power amplifier among the first power amplifier, the second power amplifier, the third power amplifier, and the fourth power amplifier, a first bias signal is applied to the one power amplifier, and
when a radio frequency signal of the second communication system is input to the one power amplifier, a second bias signal is applied to the one power amplifier, the second bias signal being different than the first bias signal.

7. The radio frequency circuit according to claim 6, wherein
a peak to average power ratio (PAPR) of the first bias signal is different than the PAPR of the second bias signal.

8. The radio frequency circuit according to claim 6, wherein
a bias voltage of the first bias signal varies in accordance with a change in a power amplitude of a radio frequency signal of the first communication system, with a first tracking degree,
a bias voltage of the second bias signal varies in accordance with a change in a power amplitude of a radio frequency signal of the second communication system, with a second tracking degree, and
the second tracking degree is higher than the first tracking degree.

9. The radio frequency circuit according to claim 6, further comprising:
a switching circuit configured to switch between applying the first bias signal to the one power amplifier and applying the second bias signal to the one power amplifier.

10. The radio frequency circuit according to claim 1, wherein
the first communication system is a fourth generation mobile communication system (4G), and
the second communication system is a fifth generation mobile communication system (5G).

11. The radio frequency circuit according to claim 1, wherein
the first communication system is a fourth generation mobile communication system (4G), and
the second communication system is a wireless local area network (WLAN).

12. The radio frequency circuit according to claim 1, wherein
the first communication system is a wireless local area network (WLAN), and
the second communication system is a fifth generation mobile communication system (5G).

13. The radio frequency circuit according to claim 12, wherein
the passband of the first filter and the passband of the third filter have an overlapping band that falls within a frequency range of from 5.15 GHz to 7.125 GHz.

14. The radio frequency circuit according to claim 1, wherein
in the second transfer circuit,
a total number of filters, each filter having, as a passband, a communication band that corresponds to a time division duplex (TDD) system, is greater than a total number of filters, each filter having, as a passband, a communication band that corresponds to a frequency division duplex (FDD) system.

15. The radio frequency circuit according to claim 1, wherein
a total number of filters, each filter being included in the second transfer circuit and having, as a passband, a communication band that corresponds to a time division duplex (TDD) system, is greater than a total number of filters, each filter being included in the first transfer circuit and having, as a passband, a communication band that corresponds to the TDD system.

16. The radio frequency circuit according to claim 1, wherein
the first transfer circuit comprises a first transmission and reception terminal configured to transmit and receive at least a radio frequency signal of the first communication system,
the second transfer circuit comprises a second transmission and reception terminal configured to transmit and receive at least a radio frequency signal of the second communication system, and
when the first transmission and reception terminal is connected to one of a first antenna or a second antenna, the second transmission and reception terminal is connected to the other of the first antenna or the second antenna.

17. The radio frequency circuit according to claim 1, further comprising:
a switch that comprises: a first antenna terminal connected to a first antenna; a second antenna terminal connected to a second antenna; and at least two selection terminals including a first selection terminal and a second selection terminal, the second antenna being different than the first antenna, wherein
the first selection terminal among the at least two selection terminals of the switch is connected to the first transfer circuit,
the second selection terminal among the at least two selection terminals of the switch is connected to the second transfer circuit,
when the first antenna terminal and the first selection terminal are connected to each other, the second antenna terminal and the second selection terminal are connected to each other, and
when the first antenna terminal and the second selection terminal are connected to each other, the second antenna terminal and the first selection terminal are connected to each other.

18. A communication device, comprising:
a radio frequency (RF) signal processing circuit configured to process a radio frequency signal to be transmitted by an antenna or a radio frequency signal received by the antenna; and
the radio frequency circuit according to claim 1, configured to transfer the radio frequency signal between the antenna and the RF signal processing circuit.

19. The communication device according to claim 18, wherein
- the first transfer circuit and the second transfer circuit are disposed on a single mounting board, or included as a single chip, and
- the RF signal processing circuit comprises:
- a first output terminal connected to the radio frequency circuit and configured to output only a radio frequency signal of the first communication system out of the first communication system and the second communication system, and
- a second output terminal connected to the radio frequency circuit and configured to output only a radio frequency signal of the second communication system out of the first communication system and the second communication system.

\* \* \* \* \*

UNITED STATES PATENT AND TRADEMARK OFFICE
CERTIFICATE OF CORRECTION

PATENT NO. : 11,265,037 B2
APPLICATION NO. : 16/903655
DATED : March 1, 2022
INVENTOR(S) : Obiya et al.

It is certified that error appears in the above-identified patent and that said Letters Patent is hereby corrected as shown below:

In the Specification

Column 3, Line 62, "151" should be -- 15T --.

Column 9, Line 25, "141." should be -- 14T. --.

Column 9, Line 32, "151," should be -- 15T, --.

Column 9, Line 55, "151," should be -- 15T, --.

Column 11, Line 15, "151," should be -- 15T, --.

Column 11, Line 58, "141, 151," should be -- 14T, 15T, --.

Column 14, Line 16, "171," should be -- 17T, --.

Column 20, Line 14, "duplexer and" should be -- duplexer 22 and --.

Signed and Sealed this
Thirteenth Day of September, 2022

Katherine Kelly Vidal
*Director of the United States Patent and Trademark Office*